United States Patent [19]

Hodges

[11] 3,936,970
[45] Feb. 10, 1976

[54] FISHING LURE AND METHOD OF FISHING

[76] Inventor: John A. Hodges, 1014 Uluopihi Loop, Kailua, Hawaii 96734

[22] Filed: May 10, 1971

[21] Appl. No.: 142,082

[52] U.S. Cl. ................................................. 43/17.6
[51] Int. Cl.² ........................................ A01K 85/00
[58] Field of Search ..................... 43/17.5, 17.6, 4.5

[56] References Cited
UNITED STATES PATENTS

| | | | |
|---|---|---|---|
| 272,317 | 2/1883 | Pflueger | 43/17.6 |
| 284,056 | 8/1883 | Pflueger | 43/17.6 |
| 1,188,655 | 6/1916 | Hewitt | 43/17.6 UX |
| 1,512,200 | 10/1924 | Davey | 43/17.5 UX |
| 1,950,933 | 3/1934 | Snell | 43/17.5 |
| 2,303,097 | 11/1942 | Townsend | 43/17.5 X |
| 2,547,308 | 4/1951 | Dean | 43/17.5 X |
| 2,566,612 | 9/1951 | Hearne | 43/17.5 X |
| 2,826,850 | 3/1958 | Laudan | 43/17.5 |
| 3,009,278 | 11/1961 | Dethloff | 43/4.5 |

FOREIGN PATENTS OR APPLICATIONS

| | | | |
|---|---|---|---|
| 108,779 | 1917 | United Kingdom | 43/17.5 |
| 1,638 | 1885 | United Kingdom | 43/17.5 |

*Primary Examiner*—Russell R. Kinsey
*Assistant Examiner*—John F. Pitrelli
*Attorney, Agent, or Firm*—Lyon & Lyon

[57] ABSTRACT

This invention relates to a fish lure which emits light having a peak wave length in the range from about 4500 A to 5000 A. The lure comprises a light source such as a luminescent material comprising a phosphor such as zinc sulfide, an extender such as magnesium carbonate and a suspending agent such as silica and zinc palmitate and a carrier for the luminescent material such as a transparent or translucent plastic. The invention also relates to a method of fishing comprising displaying the above described lure in the presence of a means for catching fish.

2 Claims, No Drawings

FISHING LURE AND METHOD OF FISHING

This invention relates to methods for harvesting fish and means for carrying out the harvesting. Fish harvesting methods vary widely from the use of spears to the use of hooks, nets, traps, or pumps. The basis for success in each of these methods is locating or attracting the fish to the device used for capture. Bait in one form or another is used to cause the aquatic animal to move toward or strike the entrapping device. Various types of lures including chemical attractants, live bait, sound projectors and light reflectors or projectors.

Luminous fish lures have been proposed. In U.S. Pat. No. 2,303,097 it is suggested that a luminous material be mixed with a molding compound and that the mixture be molded into the form of a bait. Luminescent lures have been made from materials which emit bright colors such as red and yellow which have wave lengths of about 6000 A or more. Thus, in U.S. Pat. No. 2,691,839 it is indicated that the luminescent lure described there should emit orange or yellow which is highly attractive to fish.

The luminescent lures which have been in existence have failed to exhibit a significantly greater attractiveness to fish than other lures available. Furthermore, a disadvantage of the luminescent lures presently available is that they have a relatively short life. Thus, it has been observed that the intensity of light emitted decreases rapidly with use and that the lure quickly loses its effectiveness.

It is thus desired to provide a luminescent lure which is highly attractive to fish and which has a long life at a relatively high intensity of emitted light.

According to the present invention, it has been found that the lures of this invention having a peak wave length of emitted light in the range from about 4500 A to about 5000 A are extremely effective and surprisingly many times more effective than luminescent lures having peak emissions at other wave lengths.

The lures of the present invention also emit light of a sufficiently high intensity to lure and attract fish for a much longer time than previously available luminescent lures.

The lures of this invention thus provide a method of fishing comprising attracting fish with the lures and then catching the fish with some catching means.

The lures of this invention may include light sources such as lamps or luminescent material. Luminous lures of this invention may have any desired size and shape. Thus, any lure could be made from luminescent material in accordance with this invention. The lure may be in the form of a fish or some other type of sea animal. Further, the lure may be in a shape which represents or suggests a sea animal. A particularly suitable design for the lures of this invention comprises a hollow cylindrical body with long strands projecting from one end of the body. The cylindrical body and/or the projecting strands may be made from luminescent material in accordance with this invention. The lures may also be in any desired geometric shape such as squares, discs, triangles, balls, etc.

The luminescent material comprises three major components. The first is a phosphor having a peak wave length in the range of 4500 A to 5000 A, preferably from about 4600 A to 4900 A. Any suitable phosphor material emitting light in this range may be used. An example of a suitable phosphor is zinc sulfide. However, any of the typical phosphors such as divalent metal salts, e.g., zinc, beryllium, etc., salt of silicates, borates, sulfides, phosphates, tungstenates, etc. may be used. The phosphor when mixed with a plastic is used in a concentration of up to about 25 percent by weight and preferably up to about 10 percent by weight based upon the weight of the plastic.

The second component is an extender. Any suitable extender may be used. It has been found that magnesium carbonate is a particularly suitable material which will not adversely react with the phosphor material and also provides for increased luminescent life of the mixture. The weight ratio of magnesium carbonate to phosphor should be in the range from about 1:1 to about 4:1.

The third component of the luminescent material is a suspending agent such as silica and zinc palmitate. The suspending agents tend to keep the luminescent material uniformly distributed in the plastic. The ratio of the suspending agent to phosphor should be from about 1:10 to about 1:4. Both silica and zinc palmitate act as extenders also and may be used in place of magnesium carbonate.

The luminescent material can be incorporated into the lure in any suitable manner. Thus, for example, a capsule of the phosphor material may be placed inside a lure of the desired shape. Of course, the capsule and lure are preferably transparent or translucent so that the emitted light can be seen. The preferred way of incorporating the luminescent material into a lure is to disperse it in a plastic material and then mold the plastic material into the desired shape or form. Any suitable material which is compatible with the luminescent material may be used. Preferably the plastic is transparent or translucent so that a large portion of the emitted light can be seen. Suitable plastics are commercially available molding powders such as methyl methacrylate, polystyrene, cellulose acetate, urea formaldehyde, phenol formaldehyde, polyolefins such as polyethylene and polypropylene, polyvinylchloride, teflon, polyamides, etc.

The lures of this invention have a stable composition, are rapidly activated by incident light and yield a prolonged emission at relatively high intensities at a wave length of about 4500 A to about 5000 A.

The lure may be used in conjunction with a hook. The lure may tend to hide the hook and/or attract the fish to the hook. Further, the lure may simply be an object which attracts fish to the hook net trap or other catching means. In general, any method of attracting fish to a catching means through the use of the lure is within the scope of the method of this invention. As an example, the lure of the invention may be used for tuna fishing in the following manner.

Normally, fishing for tuna involves locating schools by visual observation from search aircraft, noting the behavior of certain fishing birds or direct observation of water turbulence by feeding schools. Once located, fresh live bait is distributed within easy distance from the known position of the eating school. When the school begins actively eating upon the bait, catching begins using barbless hooks, covered with reflective pieces or shreds. Feeding frenzies last for variable lengths of time but once this behavior ceases the catch rate declines rapidly.

The procedure using luminescent lures according to this invention changes the sequence of locating and catching and increases the total catch for the same vessel manifold. The system (1) attracts the school when visual sighting is unlikely, (2) attracts the school more readily when the vessel is approaching or following visual sightings, (3) increases the catch rate during the feeding frenzy, and (4) extends the period of catch during the declining phase of the feeding frenzy. The system is as follows:

A trolling line, used to raise schools, consists of a lead-weighted luminous head of about 1 to 3 inches in length weighing from about ¼ to 1 pound. Attached to the lure is a luminescent shredded sheet providing a trailing skirt hanging in length from about 2 to 10 inches depending upon the location of the hook or hooks. This lure will attract schools both horizontally and vertically from distances of up to 1,000 feet, depending on the clarity of the water and the intensity of ambient lighting.

When the fish rise, the boat is stopped and conventional live bait or chum is cast into the region of the school to hold its position.

Catching may be accomplished by the pole method using barbless hooks covered with luminescent tubing, sheeting or tape fashioned into small, squid-shaped skirts of 1 to 4 inches overall length depending on the size of the hook.

It should be understood that instead of trolling, the luminescent lures may be stationary. Further, the lures may be placed inside stationary or moving nets or traps.

An important feature of the lures of this invention is their ability to emit light over a prolonged period. Thus, unlike prior art lures, the present lures emit light at a high intensity for a full fishing cycle which may be a period of several hours.

In addition to luminescent lures of the type described, any other source of light such as a lamp or luminescent point having a peak wave length in the range of 4500 A to 5000 A may be used according to this invention.

The reason for the attractiveness of the lures of this invention is not fully understood. It is believed that the visual attraction is an important factor but it may not be the only mechanism of attraction.

It should be understood that the foregoing examples are merely illustrative of the invention and that the scope of the invention is limited only by the scope of the appended claims. For example the ratio of phosphor, extender and suspending agent may be varied to obtain the desired lure. Also, the amount of luminescent material in the plastic can be varied to obtain the desired intensity of luminescence.

I claim:

1. A method of fishing comprising attracting fish with light having a peak wave length in the range of from 4500 A to 5000 A and catching said fish with a catching means, said light being emitted from a luminescent material comprising a phosphor, an extender capable of extending the emitting life of the phosphor and a suspending agent capable of suspending the phosphor in a plastic material, the weight ratio of the extender to the phosphor being in the ratio of from about 1:1 to about 4:1 and the ratio of the suspending agent to the phosphor being in the range of about 1:10 to 1:4.

2. The method of claim 1 wherein said catching means comprises a hook attached to said lure.

* * * * *